United States Patent
Chesney et al.

(10) Patent No.: US 7,235,510 B2
(45) Date of Patent: Jun. 26, 2007

(54) CATALYSTS

(75) Inventors: Antony Chesney, deceased, late of Durham (GB); by Graeme Bradford, legal representative, Durham (GB); William Patrick Hems, Norfolk (GB)

(73) Assignee: Johnson Matthey PLC, London (GB)

( * ) Notice: Subject to any disclaimer, the term of this patent is extended or adjusted under 35 U.S.C. 154(b) by 207 days.

(21) Appl. No.: 10/468,340

(22) PCT Filed: Feb. 7, 2002

(86) PCT No.: PCT/GB02/00527

§ 371 (c)(1), (2), (4) Date: Sep. 13, 2004

(87) PCT Pub. No.: WO02/066159

PCT Pub. Date: Aug. 29, 2002

(65) Prior Publication Data

US 2005/0164296 A1    Jul. 28, 2005

(30) Foreign Application Priority Data

Feb. 16, 2001 (GB) ................................ 0103817.3

(51) Int. Cl.
- *B01J 31/16* (2006.01)
- *B01J 31/02* (2006.01)
- *B01J 20/32* (2006.01)
- *B01J 23/00* (2006.01)

(52) U.S. Cl. ............... 502/158; 502/102; 502/104; 502/117; 502/150; 502/152; 502/153; 502/154; 502/155; 502/157; 585/250; 585/275; 585/276; 585/277; 585/310; 585/500; 585/685

(58) Field of Classification Search ............... 502/150, 502/102, 104, 117, 152, 153, 154, 155, 157, 502/158; 585/250, 275, 276, 277, 310, 500, 585/665

See application file for complete search history.

(56) References Cited

U.S. PATENT DOCUMENTS

| | | | |
|---|---|---|---|
| 4,965,234 A | 10/1990 | Luft et al. | |
| 5,082,643 A | 1/1992 | Schubert et al. | |
| 5,244,857 A | 9/1993 | Pugin et al. | |
| 5,620,938 A | 4/1997 | Sielcken | |
| 5,627,293 A | 5/1997 | Pugin | |
| 6,489,258 B1 * | 12/2002 | Ying et al. | 502/60 |
| 6,528,034 B1 * | 3/2003 | Pinnavaia et al. | 423/335 |
| 6,649,083 B1 * | 11/2003 | Pinnavaia et al. | 252/179 |
| 6,946,109 B2 * | 9/2005 | Pinnavaia et al. | 423/335 |

FOREIGN PATENT DOCUMENTS

| | | |
|---|---|---|
| EP | 0 312 102 A1 | 4/1989 |
| EP | 0 332 970 A1 | 9/1989 |
| EP | 0 496 699 A1 | 7/1992 |
| EP | 0 729 969 A1 | 9/1996 |
| WO | WO-94/04268 | 3/1994 |

OTHER PUBLICATIONS

Sudo, Yoshihisa, "Optimization of end-capping of octadecyl-silylated silica gels by high-temperature silylation", Journal of Chromatography A, 757 (1997) 21-28.*

D. Allen Ennis and Eric N. Jacobsen, Polymer-Supported Chiral Co(Salen) Complexes: Synthetic Applications and Mechanistic Investigations in the Hydrolytic Kinetic Resolution of Terminal Epoxides, *J. Am. Chem. Soc.*, vol. 121, No. 17, 1999, pp. 4147-4154.

Jacob A. Elings, Rachida Alt-Meddour, James H. Clark and Duncan J. Macquarrie, "Preparation of a silica-supported peroxycarboxylic acid and its use in the epoxidation of alkenes," *Chem. Commun.*, 1998, pp. 2707-2708.

Geon-Joong Kim and Dae-Woon Park, "The catalytic activity of new chiral salen complexes immobilized on MCM-41 in the asymmetric hydrolysis of epoxides to diols," *Catalysis Today*, vol. 63, 2000, pp. 537-547.

International Search Report from International Application No. PCT/GB02/00527, dated Jun. 4, 2002.

* cited by examiner

*Primary Examiner*—Anthony J. Green
(74) *Attorney, Agent, or Firm*—RatnerPrestia

(57) ABSTRACT

A tethered ligand comprising the reaction product of an organofunctional silica and a ligand containing a functional group capable of reaction with said organofunctional silica, wherein the organofunctional silica is prepared from an alkyl silicate and an organofunctional silane is described. A supported catalyst is also described comprising additionally a source of catalytically-active metal. Methods for preparing the tethered ligand and supported catalyst are provided and uses of the supported catalyst for performing asymmetric reactions are claimed. The catalysts are readily separable from the reaction mixtures and may be re-used if desired.

21 Claims, No Drawings

CATALYSTS

This application is the U.S. national phase application of PCT International Application No. PCT/GB02/00527.

This invention relates to ligands tethered to solid supports and in particular to ligands tethered to silica that provide a means for supporting metal catalysts which are useful for directing chemical reactions. The products of such reactions are useful, for example, as chemical intermediates or reagents for use in the production of fine chemicals or pharmaceutical intermediates.

The fixing of homogeneous catalysts to solid supports provides the potential for extending the benefits of heterogeneous catalysts to homogeneous systems. These benefits include easier separation of catalyst and reaction products leading to shorter work up times and improved process efficiency, the potential for re-activation and re-use of the supported catalysts which are often based on expensive metals and complex ligand geometry, and the possible adaptation of the immobilised catalyst to continuous flow fixed-bed processes.

Strategies for homogeneous catalyst immobilisation have been based on absorption, ion exchange or tethering the catalysts to a support using covalent attachment. By covalent attachment we mean the formation of a covalent bond between support and catalyst. Covalent attachment is attractive for providing catalysts that may be more robust to catalyst leaching and hence retain higher activities upon re-use. Covalent attachment of the metal catalyst may be achieved by forming chemical bonds between a ligand and particles of a polymer, for example polystyrene, or oxide material, for example silica, that has been subjected to a surface functionalisation.

For example, Jacobsen (*J. Am. Chem. Soc.* 1999, 121, 4147-4154) has reported the covalent attachment of the ligand 'salen' to polystyrene and fine silica particles. The ligand was immobilised by functional group interconversion to add a linking molecule with a siloxy group at the end. The ligand was then grafted onto 10 μm spherical silica particles and used for the hydrolytic kinetic resolution of a variety of terminal epoxides. Kim et al (*Catalysis Today.* 2000, 63, 537-547) described confining a chiral catalyst on an alkyl silicate-derived silica-MCM-41 by a multi-step process including surface treating the silica material with 3-aminopropyl trimethoxysilane to activate the silica prior to reaction with a precursor of the required chiral catalyst and then further treatment to produce the immobilised catalyst.

These methods for providing covalent attachment of ligand and catalyst depend upon the surface activity of the silica material being subjected to treatment Variations in the silica material may result in catalysts with lower enantioselectivities and/or efficiencies than the homogeneous counterpart. Furthermore, the practical advantages gained by covalent attachment to a support are often outweighed by the added complexity associated with synthesising the appropriately modified support and/or chiral ligand.

Improved consistency in functionalised silicas is required. Clarke and Macquarrie (*Chem. Commun.*, 1998, 2707-2708) describe a method for generating a silica-supported peroxycarboxylic acid for the epoxidation of alkenes wherein the silica is prepared via a co-hydrolysis of tetraethylorthosilicate and 2-cyanoethyltriethoxysilane. However, the resulting peroxyacid is not suitable for tethering homogeneous catalysts.

We have now found that homogeneous catalysts may be successfully immobilised using functionalised silicas prepared from alkyl silicates and organofunctional silanes.

According to the invention we provide a tethered ligand comprising the reaction product of an organofunctional silica and a ligand containing a functional group capable of reaction with said organofunctional silica, wherein the organofunctional silica is prepared from an alkyl silicate and an organofunctional silane.

According to a further aspect of the invention we provide a supported catalyst comprising the reaction product of an organofunctional silica, a ligand containing a functional group capable of reaction with said organofunctional silica and a source of catalytically-active metal, wherein the organofunctional silica is prepared from an alkyl silicate and an organofunctional silane.

According to a further aspect of the invention, we also provide a method for the preparation a tethered ligand comprising the steps of;
  a) forming an organofunctional silica by the reaction of an alkyl silicate, an organofunctional silane and water, optionally in the presence of a template compound,
  b) removing the template compound if present, and
  c) reacting said organofunctional silica with a ligand containing a functional group capable of reaction with said organofunctional silica.

According to a further aspect of the invention, we also provide a method for the preparation of a supported catalyst comprising the steps of;
  a) forming an organofunctional silica by reaction of an alkyl silicate, an organofunctional silane and water, optionally in the presence of a template compound,
  b) removing the template compound if present,
  c) reacting said organofunctional silica with a ligand containing a functional group capable of reaction with said organofunctional silica to produce a tethered ligand and
  d) carrying out a chemical reaction between a metal compound and said tethered ligand.

According to a further aspect of the invention, we also provide the use of a supported catalyst comprising the reaction product of an organofunctional silica, a ligand containing a functional group capable of reaction with said organofunctional silica and a source of catalytically-active metal, wherein the organofunctional silica is prepared from an alkyl silicate and an organofunctional silane, for hydrogenation reactions, dihydroxylation reactions, hydrolysis reactions, metathesis reactions, carbon-carbon bond formation reactions, hydroamination reactions, epoxidations, aziridinations, cycloadditions, hetero-Diels-Alder reactions, hetero-ene reactions, Claisen rearrangements, carbonyl reductions, sigmatropic rearrangements, additions of nucleophiles to π-bonds, addition of nucleophiles to carbonyl groups and ring-opening reactions.

The present invention relates to tethered ligands. By the term 'tethered ligand' we mean an organic ligand covalently bound to a solid silica support. By the term 'ligand' we mean any molecule capable of reacting with a metal compound to produce a catalyst Organofunctional silicas of the present invention are prepared from alkyl silicates and organofunctional silanes. The alkyl silicates are tetraalkylsilicates which have the general formula $Si(OR)_4$ in which each R may be the same or different and is an alkyl group or substituted alkyl group having between 1 and 4 carbon atoms. Alkyl silicates useful for the present invention include tetramethylorthosilicate, tetraethylorthosilicate and tetrapropylorthosilicate or mixtures of these. Preferably, the alkyl silicate is tetraethylorthosilicate or tetramethylorthosilicate.

The organofunctional silane of the present invention may be halo or alkoxy organofunctional silane according to the general formula $(Y)_aSi((Z)X)_b$ in which;

Y is a halogen or alkoxy group having 1 to 3 carbon atoms;

Z is an alkyl, aryl or alkyl-aryl group which optionally contains at least one heteroatom selected from oxygen, nitrogen, phosphorus or sulphur; and X is a functional group selected from halide, hydroxyl, carbonyl, carboxyl, anhydride, carbene, methacryl, epoxide, vinyl, nitrile, mercapto, amine, imine, amide and imide;

a=3 or 2, b=1 or 2 and a+b=4.

In the above formula, if Z contains an alkyl group it preferably has between 1 and 16 carbon atoms, is branched or linear and saturated or unsaturated. If Z contains an aryl group it is preferably a substituted or unsubstituted phenyl, phenoxy or anilide moiety. Where X is bound to an alkyl group it may be bound on either a primary, secondary or tertiary carbon.

The organofunctional silane may be selected from those commercially available or if desired may be prepared by reaction of an organofunctional silane with a linker molecule that provides a functional group capable of reaction with a functional group-containing ligand. The linker molecule may be any that contains a functional group that is capable of reacting with the organofunctional silane and provides a suitable functional group in the resultant silica material capable of reacting with a functional group-containing ligand. Suitable linker molecules include C1-C10 alkyl, alkoxy, alkyl-aryl, aryl, phenoxy or anilide compounds containing functional groups selected from halide, hydroxyl, carbonyl, carboxyl, anhydride, carbene, methacryl, epoxide, vinyl, nitrile, mercapto, isocyanate, amine, imine, amide and imide. Advantages of preparing the organofunctional silane in this way are that new functional groups may be introduced in a way that is not generally possible in commercially available silanes, functional groups may be introduced at a greater distance from the silicon atom than is possible with currently available silanes, and such modification may provide organofunctional silanes that provide improvements in the properties of the resulting organofunctional silica, e.g. porosity.

Mixtures of organofunctional silanes having different functional groups may be used in the present invention. In such mixtures 2 or more silanes may be present.

Optionally, a silane not having a functional group capable of reaction with a functional group-containing ligand may be used In combination with an organofunctional silane as described above to e.g. reduce the surface concentration of functional groups on the silica material and improve ligand attachment. Such non-functionalised silanes may also be used to improve other properties of the resulting silica material such as porosity or pore size. Typically silanes such as alkyl silanes can be used although other non-functionalised silanes may also be used. The molecular ratio of functionalised and non-functionalised silanes used may be any that provides a sufficient number of reactive sites for tethering the ligand containing a functional group to the resulting organofunctional silica to provide a useful level of catalytic activity in the final catalyst. Molecular ratios may be in the range 1:99 to 99:1 for any given pair of silanes, preferably 1:9 to 9:1.

Organofunctional silanes useful for the present invention include vinyltrimethoxy silane, vinyltriethoxysilane, dichlorodivinylsilane, 3-(aminopropyl)trimethoxysilane, 3-(aminopropyl)triethoxysilane, [3-(methacryloyloxy)-propyl]trimethoxysilane, [3-[tri(ethoxy/methoxy)silyl]propyl]urea, 3-(glycidoxypropyl)trimethoxysilane, 4-(triethoxysilyl)butyronitrile, 3-(Iodopropyl)trimethoxysilane, 3-(mercaptopropyl)-trimethoxysilane, 3-(triethoxysilyl)propionitrile, 4-(triethoxysilyl)butyronitrile, ((chloromethyl)-phenylethyl)trimethoxysilane, and ((chloromethyl)phenyl)trimethoxysilane and mixtures of these.

Non-functionalised silanes useful for the present invention include alkyl silanes having 1 to 16 carbon atoms such as propyltrimethoxysilane, propyltriethoxysilane, butyltrimethoxysilane, hexylbutyltrichlorosilane, dodecyltrichlorosilane, octadecyltrimethoxysilane, octyltrimethoxysilane, octyltriethoxysilane and mixtures of these.

The ligand containing a functional group suitable for reaction with the organofunctional silica may be a chiral or non-chiral mono-, bi-, tri- or tetra-dentate ligand. If a chiral ligand is used it may be a racemic or non-racemic mixture or single enantiomer having a reactive group capable of reacting with the organofunctional silica. Typically such ligands include β-diketonates, β-ketoesters, alkanolamines, Schiff bases, aminoacids, peptides, phosphates, phosphites, alkyl- or aryl-phosphines, diamines, crown-ethers and bisoxazolines. Preferred ligands containing a functional group are chiral ligands and include, but are not limited to racemic and non-racemic mixtures or single enantiomers of bidentate ligands such as;

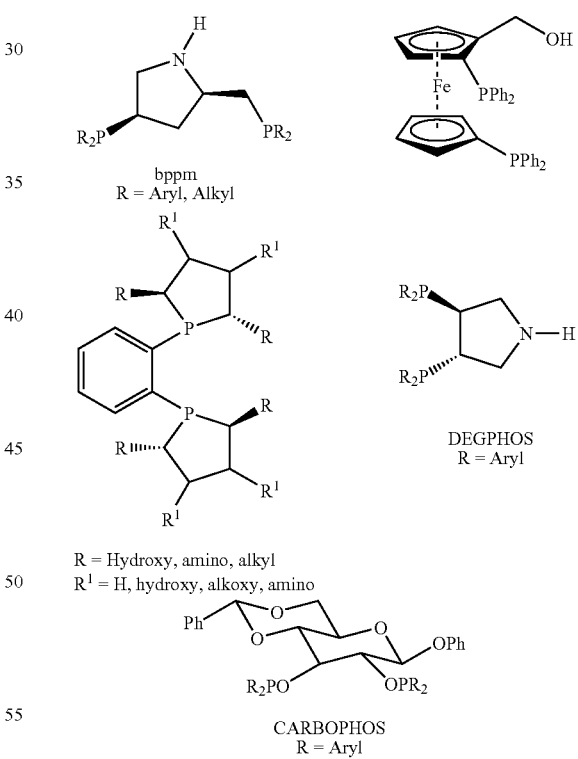

The functional groups to be reacted with the organofunctional silica may conveniently be introduced into the ligand during its preparation. If a functional group available on the ligand is unsuitable for reaction with the organofunctional silica, it may be converted by chemical reaction or alternatively, the ligand may be reacted with a linker molecule that provides a suitable functional group capable of reaction with the organofunctional silica. Suitable functional groups on the ligand include halide, hydroxyl, carbonyl, carboxyl, anhydride, carbene, methacryl, epoxide, vinyl, nitrile, mercapto, amine, imine, amide and imide.

The catalytically-active metal to be reacted with the ligand tethered to the organofunctional silica is selected from the group comprising Sc, Ti, Zr, Hf, V, Nb, Ta, Cr, Mo, W, Mn, Tc, Re, Fe, Ru, Co, Rh, Ir, Ni, Pd, Pt, Cu, Ag, Al, Ge, Sb and Sn. Preferably, for asymmetric hydrogenation, the metal is selected from Rh, Ir or Ru; preferably for hydrolytic kinetic resolution of epoxides the metal is selected from Co; preferably for ring-opening reactions the metal is selected from Cr and Al; and preferably for Heck reactions the metal is Pd. The source of the metal may be any suitable for reaction with the ligand tethered to the organofunctional silica. Preferably the source of the metal is an organic complex of the metal or a metal salt. For example rhodium may be reacted as a 1,5-cyclooctadiene complex and for manganese, palladium or cobalt the metal may be reacted as the di-acetate.

A method for preparing an organfunctional silica by the co-hydrolysis of an alkyl silicate and an organofunctional silane is depicted below. The wavy line represents the silicon atom on or within the resulting silica material.

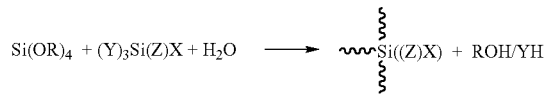

In one embodiment, alkyl silicate and organofunctional silane are added to a mechanically stirred mixture of solvent and water. The alkyl silicate and organofunctional silane may be added together, sequentially in any order or in alternating portions. In an alternative embodiment the alkyl silicate, organofunctional silane and solvent are added to the mechanically stirred water and in yet a further embodiment the alkyl silicate and organofunctional silane without solvent are added to the mechanically stirred water. The alkyl silicate and organofunctional silane are added at a molecular ratio of greater than or equal to 1:1 (silicate:silane). Preferably the ratio of alkyl silicate to silane is between 1:1 and 99:1 and more preferably between 1:1 and 10:1. Typically the solvent, if used, is an alcohol but may be any other solvent suitable for performing the co-hydrolysis reaction. For example, the solvent may be methanol, ethanol or propanol. Water is present in sufficient quantity to cause complete hydrolysis of the alkoxide moieties on the alkyl silicate and is generally added in large excess.

A template compound may be added to the hydrolysis mixture to influence the resulting pore structure and potentially the disposition of the organofunctionality within the pores of the resulting organofunctional silica. Depending upon the method used, the template may be added to for example, the solvent/water mixture, the alkyl silicate/organofunctional silane/solvent mixture or the alkyl silicate/organofunctional silane mixture. The templates function by becoming entrapped in the silica as it forms during the co-hydrolysis of the alkyl silicate and organofunctional silane. Once the co-hydrolysis is complete, the entrapped template may then be removed by, for example, solvent extraction to leave behind pores corresponding to the structure of the template molecule. Suitable solvents for solvent extraction include alcohols, e.g. ethanol. Template compounds may be used in the preparation of mico- and meso-porous silicas (where a micro-porous silica has an average pore width of less than 20 Å and a meso-porous silica has an average pore width of between 20 and 500 Å). Preferably the organofunctional silica of the present invention is a meso-porous silica having an average pore width, as measured by BET porosimetry, of between 20 and 500 Å.

Template compounds include amines, quaternary ammonium salts and non-ionic poly(ethylene oxide)/(propylene oxide) surfactants such as amphilic block copolymers. Suitable amphilic block copolymers are tri-block copolymers, e.g. PLURONIC™ F127 ($EO_{106}PO_{70}EO_{106}$) and PLURONIC™ 123 ($EO_{20}PO_{70}EO_{20}$) and mixtures of these. The quaternary ammonium compounds are quaternary ammonium salts or hydroxides e.g. of general formula $[R_4N]^+[Z]^-$ in which R may be the same or different and is alkyl or substituted alkyl (C1-C30), and Z is preferably Cl, Br, or OH. Quaternary ammonium compounds wherein the nitrogen atom forms part of a ring structure may also be used. Suitable quaternary ammonium compounds are tetrapropylammonium hydroxide, tetrapropylammonium chloride, tetrabutylammonium hydroxide, benzyltrimethylammonium hydroxide, benzylcetyldimethylammonium chloride, benzyltrimethylammonium hydroxide, benzyltrimethylammonium chloride, cetyltrimethyl ammonium hydroxide, cetyltrimethylammonium bromide, cetyltrimethylammonium chloride and mixtures of these. Preferably the template molecule is an amine. Suitable amines are amines having 10 or more carbon atoms in the structure and preferably are C12 to C18 alkyl amines such as n-dodecylamine or n-octadecylamine or mixtures of these. The amount of template compound required will depend upon a number of factors including the amount of alkyl silicate used. In general the relative amounts of template molecule may vary in the range 1:10 to 50:1 and preferably in the range 1:1 to 10:1 parts by weight silicate:template compound.

In addition to the template, a pore-enlarging additive may be included in the hydrolysis mixture. A known pore-enlarging additive is mesitylene (1,3,5-trimethylbenzene). Depending upon the method chosen for performing the co-hydrolysis reaction, the pore swelling additive may for example, be combined with the silicate and organofunctional silane or with the water or water/solvent mixture or may be added separately to the hydrolysis mixture. The amount of pore-enlarging additive that may be added will depend upon the properties of the additive, for example in the present invention 1-2 moles of mesitylene may be added per mole of alkyl silicate.

The co-hydrolysis reaction may be performed at room temperature or if desired at elevated temperature depending on the physical properties of the solvent chosen. For example the co-hydrolysis reaction may be carried out at between 10-50° C. for periods between 1 and 36 hours. When the co-hydrolysis reaction is complete the organofunctional silica is recovered by, for example filtration and the template, if present, removed by solvent extraction. Solvent extraction may be effected for example by heating the re-suspended organofunctional silica in a suitable solvent such as ethanol. This may be repeated as necessary to remove all of the template prior to attachment of the functional group-containing ligand.

It may be desirable to change the functional groups present on the organofunctional silica to, for example, provide a different functional group with which to react the functional group containing-ligand. For example, if the functional group containing-ligand has a pendant hydroxyl group capable of reaction with the organofunctional silica, it may be desirable to chemically convert the functional group on the silica from, for example a cyano-group to a carboxyl group or, a carboxyl group to an acid-chloride group, to facilitate a reaction between said silica and said ligand. Such conversions may also provide a means for providing functional groups on the silica not practical as a result of the method used for preparing the organofunctional silica. For example, isocyanate groups that would be unstable to the water used during the co-hydrolysis of alkyl silicate and organofunctional silane may be provided by inter-conversion of acid-chloride via a Curtis rearrangement Alternatively, a chemical conversion may be performed to reduce the surface concentration of functional groups capable of reaction with the functional group-containing ligand by, for example, converting the functional groups to unreactive species such as hydrogen or alkyl groups.

Alternatively the organofunctional silica may be reacted with a linker molecule that provides a functional group capable of reaction with a functional group-containing ligand, to form a new organofunctional silica. This may be of particular use where chemical conversion of functional groups is difficult. The linker molecule may be any that is capable or reacting with the organofunctional silica and provides a suitable functional group for reacting with the ligand. Suitable linker molecules include C1-C10 alkyl, alkoxy, alkyl-aryl, aryl, phenoxy or anilide compounds containing functional groups selected from halide, hydroxyl, carbonyl, carboxyl, anhydride, carbene, methacryl, epoxide, vinyl, nitrile, mercapto, isocyanate, amine, imine, amide and imide. Suitable linker molecules include (3-Formylindol-1-yl)acetic acid, [3-({Ethyl-Fmoc-amino}-methyl)-indol-1-yl]-acetic acid, 2,4-Dimethoxy-4'-hydroxy-benzophenone, 3,5-Dimethoxy-4-formyl-phenol, 3-(4-Hydroxymethylphenoxy)propionic acid, 3-Carboxypropanesulfonamide, 3-Hydroxy-xanthen-9-one, 3-Methoxy-4-formylphenol, 4-(2-Bromopropionyl)phenoxyacetic acid, 4-(4-[Bis-(4chlorophenyl)hydroxymethyl]phenoxy)butyric acid dicyclohexylammonium salt, 4-(4-Formyl-3-methoxy-phenoxy)-butyric acid, 4-(4-Hydroxymethyl-3-methoxyphenoxy)-butyric acid, 4-[4-(1-(Fmocamino)ethyl)-2-methoxy-5nitrophenoxy)butanoic acid, 4-[4-(1-Hydroxyethyl)-2-methoxy-5-nitrophenoxy)butanoic acid, 4-[4-(2,4-Dimethoxybenzoyl)phenoxy]butyric acid, 4-[4-(Diphenylhydroxymethyl)phenoxy]butyric acid dicyclohexylammonium salt, 4-[4-Hydroxymethyl-2-methoxy-5-nitrophenoxy)butanoic acid, 4-Hydroxy-2,6-dimethoxy-benzaldehyde, 4-Hydroxy-2-methoxy-benzaldehyde, 4-Hydroxymethylbenzoic acid, 4-Hydroxymethylphenoxyacetic acid, 4-Sulfamoyl-butyric acid and p-[(R,S)-α-[1-(9H-Fluoren-9-yl)-methoxyformamido]-2,4-dimethoxybenzyl]-phenoxyacetic acid A reaction of a ligand containing a functional group with an organofunctional silica to provide a tethered ligand is depicted below. Y represents the functional group on the ligand capable of reaction with the organofunctional silica and A represents the covalent bond between ligand and organofunctional silica;

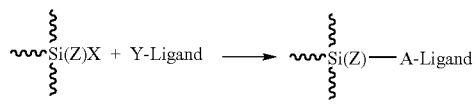

The reaction may be achieved by any effective chemical reaction between the functional groups of the organofunctional silica and the functional group containing-ligand. Typical reactions include for example, esterification reactions, amidation reactions, addition reactions, substitution reactions, insertion reactions and carbon-carbon coupling reactions and may be performed by any method known to those skilled in the art. For example, esterification reactions may be performed between ligand and silica either having carboxyl and hydroxyl groups, anhydride and hydroxyl groups or acid-chloride and hydroxyl groups in the presence of suitable catalysts or reagents. Amidation reactions may be performed between ligand and silica either having carboxyl groups and primary or secondary amine groups or anhydride groups and primary or secondary amine, again in the presence of suitable catalysts or reagents.

A reaction of a metal with a tethered ligand to provide a supported catalyst is depicted below;

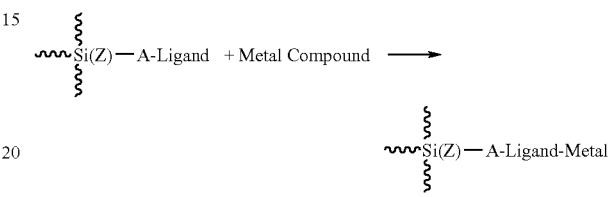

The reaction may be achieved by methods known to those skilled in the art and is preferably effected by reaction of a metal compound with the tethered ligand. Such reactions include, for example, ligand substitution reactions and metal-insertion reactions. The metal may also, if desired, be subjected to steps of oxidation or reduction to provide the necessary catalytic activity. For example cobalt catalysts may be oxidised from Co(II) to Co(III) or rhodium catalysts may be reduced from Rh(III) to Rh(I).

Preferably the tethered ligands of the present invention are chiral ligands providing supported chiral catalysts. The supported chiral catalysts of the present invention may be applied to a large number of asymmetric reactions used to produce chiral products. Such reactions include hydrogenation reactions, dihydroxylation reactions, hydrolysis reactions, metathesis reactions, carbon-carbon bond formation reactions such as Heck or Suzuki reactions, hydroamination reactions, epoxidations, aziridinations, cycloadditions, hetero-Diels-Alder reactions, hetero-ene reactions, Claisen rearrangements, carbonyl reductions, sigmatropic rearrangements, additions of nucleophiles to π-bonds, addition of nucleophiles to carbonyl groups and ring-opening reactions. Preferably the reactions are hydrogenation reactions, hydrolysis reactions and carbon-carbon bond formation reactions. The advantages of the catalysts of the present invention are that they are readily separated from the reaction products and may be re-used if so desired.

The invention is illustrated by the following examples.

EXAMPLE 1

Preparation of Catalyst A (a) Preparation of Mesoporous Carboxylic Acid-Functionalised Silica A mixture of ethanol (105 ml), de-ionised water (105 ml) and n-dodecylamine (10 g) was prepared and stirred vigorously at room temperature until homogeneous. To this mixture, tetraethylorthosilicate (20.4 g) and 3-(triethyoxysilyl)propionitrile (23.1 g) were added stepwise over 30 minutes with continued stirring for 24 hours. After this time the precipitate was filtered, washed with de-ionised water (500 ml) and ethanol (500 ml) then allowed to dry at room temperature for 24 hours. Extraction of n-dodecylamine was achieved by heating the solid at reflux in ethanol (200 ml) for 3 hours. This reflux was repeated three times. The solid was then filtered and dried in a vacuum oven at 80° C. overnight. Hydrolysis of the nitrile functionality was achieved by heating the solid to 120° C. in 50% v/v aqueous sulphuric acid (150 ml per 5 g) for 3 hours. The solid was filtered and washed with excess de-ionised water until natural pH was achieved before drying in a vacuum oven at 80° C. overnight. BET porosimetry analysis of the silica indicated that it had an average pore width of 40 Å.

(b) Tethering of Ligand

To a stirred suspension of the mesoporous carboxylic acid functionalised silica (0.1 g), bppm (0.05 g, 0.11 mmol) and 4-dimethylaminopyridine (DMAP) (3.0 mg,) in dichloromethane (2.5 ml) was added diisopropylcarbodiimide (DIC) (17 µl, 0.11 mmol). The resulting suspension was stirred overnight at room temperature. The mixture was filtered and the resulting solid washed with dichloromethane (5 ml), methanol (5 ml) and dichloromethane (5 ml). The solid was dried under vacuum to give the ligand supported Silica as a colourless solid.

(c) Insertion of Metal

A mixture of the ligand supported silica (0.1 g) and [Rh(cod)$_2$]BF$_4$ (44 mg, 0.1 mmol) in dichloromethane (2.5 ml) was stirred for 1 hr under nitrogen. The mixture was then filtered and the solid washed with dichloromethane (2.5 ml), methanol (5 ml) and dichloromethane (2.5 ml). The solid was dried under vacuum to give the Rh-ligand supported silica as a yellow solid. The tethering of ligand (I) and insertion of metal (II) may be depicted as follows;

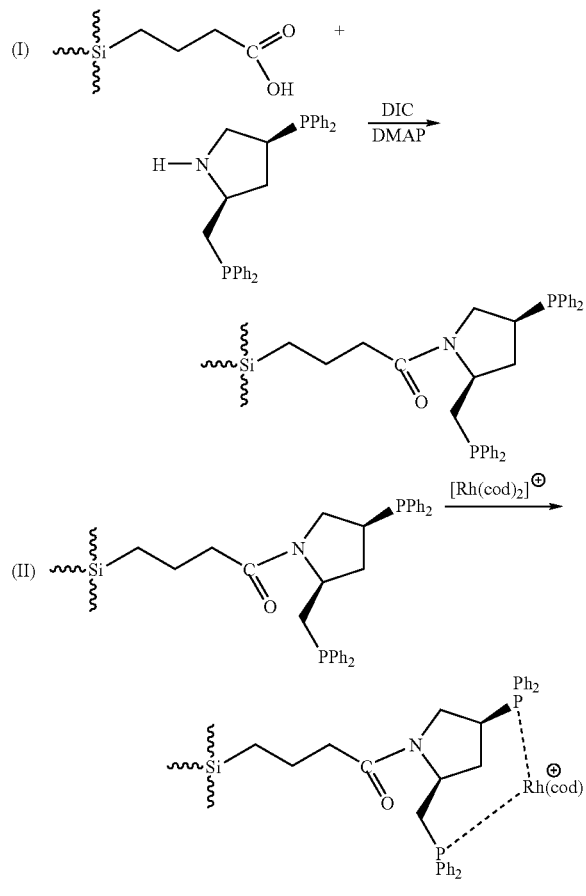

EXAMPLE 2

Hydrogenation of Dimethylitaconate

Dimethylitaconate was hydrogenated according to the following scheme;

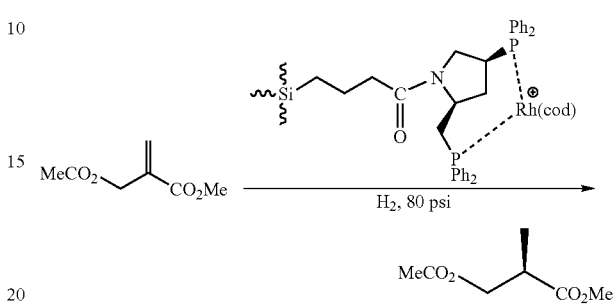

Dimethylitaconate substrate and catalyst were weighed into a glass-liner that was placed inside a 50 ml autoclave to give a substrate:catalyst molar ratio of 100:1. The autoclave was sealed and flushed with nitrogen. The autoclave was then pressurised with hydrogen to 80 psi (506.6 kPa) and then released (cycle repeated 5 times). Sufficient methanol was added to the autoclave to give an approximately 1M solution and the 5 cycles of pressurising-releasing with hydrogen were repeated. Finally the autoclave was pressurised with H$_2$ to 80 psi (506.6 kPa) and left to stir. After the desired time the stirring was stopped and the H$_2$ released slowly. The autoclave was opened and the mixture filtered to recover the supported catalyst. Gas-chromatographic analysis of the filtrate was performed to determine conversion and enantiomeric excess (ee %). The results are given below.

| Catalyst | Conversion (%) | ee (%) |
| --- | --- | --- |
| Catalyst A | 100 | 17 |

The result demonstrates that highly active catalysts can be prepared according to the present invention, that provide a means for producing chiral products and which are easily separated from the reaction mixture.

EXAMPLE 3

Preparation of Tethered Ferrocenyl Ligand

An organofunctional silica prepared according to the method of example 1 part (a) was reacted with a ferrocenyl-bis(phosphine) ligand according to the following scheme;

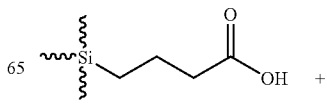

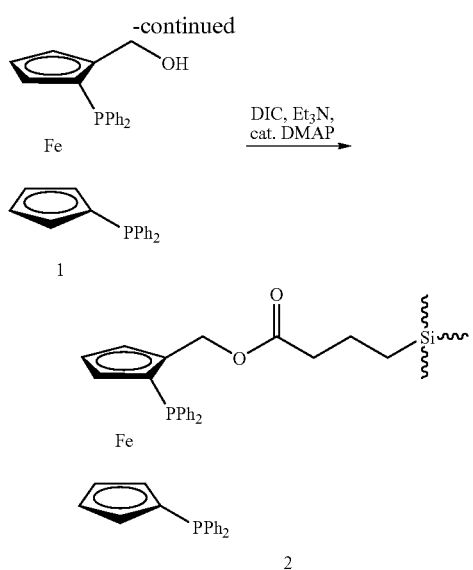

An oven dried Schlenk tube was charged under nitrogen with carboxy-functional silica prepared according to the method of example 1 part (a) (0.213 g, 0.64 mmol; approx. 3 mmol/g loading) and dry dichloromethane (3 ml). 1,1'-Carbonyldiimidazole (0.104 g, 0.64 mmol) was added, and the mixture was stirred until the bubbling ceased (approx. 15 min). The phosphine 1 (0.185 g, 0.32 mmol) was added followed by dry dichloromethane (1 ml). After stirring for 20 hours at room temperature under nitrogen, methanol (10 ml) was added, the mixture was filtered, and the solid was washed with dichloromethane, methanol, and once more with dichloromethane. The resulting beige solid was dried under high vacuum to give 0.202 g 2. ICP analysis: 0.52% Fe (w/w), 0.093 mmol/g loading; 0.60% P (w/w), 0.097 mmol/g loading; the average loading is therefore 0.095 mmol/g.

EXAMPLE 4

Heck Reaction Using a Supported Catalyst

A Heck reaction was performed using the tethered ligand of Example 3 reacted with palladium acetate according to the following scheme;

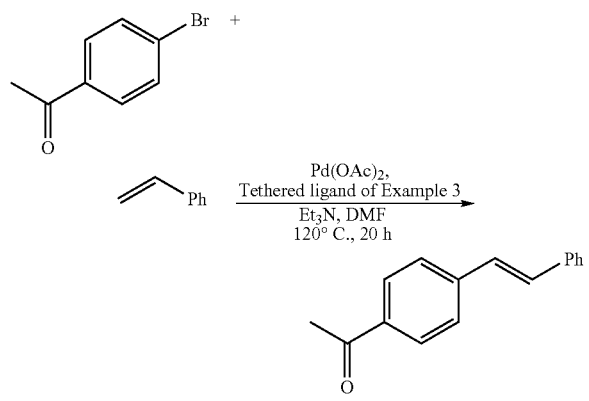

An oven dried Schlenk flask was charged with Pd(OAc)$_2$ (2.2 mg, 0.01 mmol, 1 mol %) and tethered ligand 2 (45.8 mg, 0.0044 mmol, 0.44 mol %). The flask was evacuated and backfilled with nitrogen and then capped with a rubber septum. Dry dimethylformamide (5 ml) was added and the mixture was stirred for 60 min at room temperature under nitrogen. 4'-Bromoacetophenone (0.199 g, 1.0 mmol), styrene (0.137 ml, 1.2 mmol), and triethylamine (0.195 ml, 1.4 mmol) were added successively. The rubber septum was replaced with a glas stopper, the flask was sealed, and the mixture was stirred at 120° C. for 20 h. After cooling to room temperature, the mixture was filtered, and the solid was washed with methyl-t-butyl ether (MTBE), water, MeOH, acetone, and once more with MTBE. The phases of the filtrate were separated and the aqueous phase was extracted with MTBE (2×30 ml). The combined organic extracts were dried over MgSO$_4$ and concentrated under reduced pressure. The crude product was purified by flash chromatography on silica gel (hexane/EtOAc, 10/1 to 1/1) to give E-4-acetylstilbene (0.192 g, 86%) as a white solid.

EXAMPLE 5

Preparation of a Carboxylic Acid-Functionalised Silica Using a Mixture of Functionalised and Non-Functionalised Silanes A mixture of dodecylamine (10 g), deionised water (105 ml) and denatured (5% MeOH) ethanol (105 ml) was prepared and stirred for 30 minutes until homogeneous. To this, mesitylene (1 9.5 g) was added and the resultant cloudy emulsion was stirred for a further 30 minutes. After this time, a freshly prepared mixture of 4-triethoxysilylbutyronitrile (11.5 g) and propyltrimethoxysilane (8.5 g) was added with continual stirring. After a further 60 minutes tetraethylorthosilicate (20.8 g) was added to the mixture and the resultant slurry stirred for a period of 24 hours. After this time the precipitate was filtered, washed with de-ionised water (500 ml) and ethanol (500 ml) then allowed to dry at room temperature for 24 hours. Template extraction and hydrolysis of the nitrile functionality were performed as described in Example 1 part (a) to yield a white solid having a nitrogen content of 3.6% by weight compared with 7.2% by weight for the silica material prepared without the propyltrimethoxysilane.

The invention claimed is:

1. A tethered ligand comprising the reaction product of a meso-porous organofunctional silica having an average pore width, as measured by BET porosimetry, of between 20 and 500 Angstroms and a ligand selected from the group consisting of a chiral mono-, bi-, tri- or tetra-dentate ligand and non-chiral mono-, bi-, tri- or tetra-dentate ligand containing a functional group reactive with said organofunctional silica, wherein the organofunctional silica is prepared from an alkyl silicate and at least one organofunctional silane.

2. A tethered ligand according to claim 1, wherein the alkyl silicate has the general formula Si(OR)$_4$ in which each R may be the same or different and is an alkyl group or substituted alkyl group having between 1 and 4 carbon atoms.

3. A tethered ligand according to claim 1, wherein the at least one organofunctional silane has the general formula (Y)$_a$SI((Z)X)$_b$ in which;
Y is a halogen or alkoxy group having 1 to 3 carbon atoms;

Z is selected from the grouo consisting of an alkyl, an aryl and an alkyl-aryl group, which optionally contains at least one heteroatom selected from oxygen, nitrogen, phosphorus or sulphur;

X is a functional group selected from the grouo consisting of halide, hydroxyl, carbonyl, carboxyl, anhydride, carbene, methacryl, epoxide, vinyl, nitrile, mercapto, amine, imine, amide and imide;

a=3 or 2, b=1 or 2 and a+b=4.

4. A tethered ligand according to claim 1, wherein the at least one organofunctional silane is prepared by reaction of an organofunctional silane with a linker molecule that contains a functional group reactive with the organofunctional silane and a functional group reactive with a functional group-containing ligand, said linker molecule selected from the group consisting of C1-C10 alkyl, alkoxy, alkyl-aryl, aryl, phenoxy and anilide compounds containing functional groups selected from the grouo consisting of halide, hydroxyl, carbonyl, carboxyl, anhydride, carbene, methacryl, epoxide, vinyl, nitrile, mercapto, isocyanate, amine, imine, amide and imide.

5. A tethered ligand according to claim 1, wherein more than one organofunctional silane is used.

6. A tethered ligand according to claim 1, wherein the organofunctional silica is prepared from the alkyl silicate and the at least one organofunctional silane and a silane not having a functional group reactive with a functional group-containing ligand.

7. A tethered ligand according to claim 1, wherein the functional group on the organofunctional silica is changed by chemical conversion before reaction of the organofunctional silica with the functional group-containing ligand.

8. A tethered ligand according to claim 1, wherein the organofunctional silica is reacted with a linker molecule that contains a functional group reactive with the organofunctional silica and a functional group reactive with a functional group-containing ligand.

9. A tethered ligand according to claim 1, wherein the ligand containing a functional group is a racemic or non-racemic mixture or single enantiomer of a β-diketonate, β-ketoester, alkanolamine, Schiff base, aminoacid, peptide, phosphite, phosphate, alkyl- or aryl- phosphine, diamine, crown-ether and bis-oxazoline, each having a reactive group selected from the group consisting of halide, hydroxyl, carbonyl, carboxyl, anhydride, carbene, methacryl, epoxide, vinyl, nitrile, mercapto, amine, imine, amide and imide.

10. A method for the preparation of a tethered ligand comprising the steps of;
   a) forming an organofunctional silica by the reaction of an alkyl silicate, at least one organofunctional silane and water, optionally in the presence of a template compound,
   b) removing the template compound if present, and
   c) reacting said organofunctional silica with a ligand selected from the group consisting of a chiral mono-, bi-, tri- or tetra-dentate ligand mono-, bi-, tri- or tetra-dentate ligand containing a functional group reactive with said organofunctional silica.

11. A method according to claim 10, wherein the functional group present on the organofunctional silica formed in step (a) is changed by a chemical conversion before reaction of the organofunctional silica with the functional group-containing ligand.

12. A method according to claim 10, wherein the organofunctional silica formed in step (a) is reacted with a linker molecule that contains a functional group reactive with the organofunctional silica and a functional group reactive with a function group-containing ligand.

13. A method according to claim 10, wherein the molecular ratio of alkyl silicate to organofunctional silane is 1:1 to 99:1.

14. A supported catalyst comprising the reaction product of a tethered ligand as claimed in claim 1 and a source of catalytically-active metal.

15. A catalyst according to claim 14, wherein the catalytically-active metal is selected from the group consisting of Sc, Ti, Zr, Hf, V, Ta, Cr, Mo, W, Mn, Tc, Re, Fe, Ru, Co, Rh, Ir, Ni, Pd, Pt, Cu, Ag, Al, Ge, Sb and Sn.

16. A catalyst according to claim 14, wherein the source of catalytically-active metal is an organic complex of the metal or metal salt.

17. A method for the preparation of a supported catalyst comprising the steps of;
   a) forming an organofunctional silica by reaction of an alkyl silicate, at least one organofunctional silane and water, optionally in the presence of a template compound,
   b) removing the template compound if present,
   c) reacting said organofunctional silica with a ligand selected from the group consisting of a chiral mono-, bi-, tri- or tetra-dentate ligand and non-chiral mono-, bi-, tri- or tetra-dentate ligand containing a functional group reactive with said organofunctional silica to produce a tethered ligand and
   d) carrying out a chemical reaction between a metal compound and said tethered ligand.

18. In a process for the production of chiral products from at least one reactant of a reaction, wherein the reaction is selected from the group consisting of hydrogenation reactions, dihydroxylation reactions, hydrolysis reactions, metathesis reactions, carbon-carbon bond formation reactions, hydroamination reactions, epoxidations, aziridinations, cycloadditions, hetero-Diels-Alder reactions, hetero-ene reactions, Claisen rearrangements, carbonyl reductions, sigmatropic rearrangements, additions of nucleophiles to π-bonds, addition of nucleophiles to carbonyl groups and ring-opening reactions, wherein the improvement comorises the steo of introducing the reactants to a supported catalyst according to claim 14.

19. The process according to claim 18 wherein the reaction is selected from the group consisting of hydrogenation reactions, hydrolysis reactions and carbon-carbon bond formation reactions.

20. The process according to claim 18, further comprising the step of separating the catalyst from the reaction mixture, and using the catalyst in subsequent reactions.

21. The process according to claim 19, further comprising the step of separating the catalyst from the reaction mixture, and reusing the catalyst in subsequent reactions.

* * * * *

UNITED STATES PATENT AND TRADEMARK OFFICE
CERTIFICATE OF CORRECTION

PATENT NO.        : 7,235,510 B2
APPLICATION NO.   : 10/468340
DATED             : June 26, 2007
INVENTOR(S)       : Antony Chesney, deceased et al.

It is certified that error appears in the above-identified patent and that said Letters Patent is hereby corrected as shown below:

At column 13, line 56, "bi-, tri- or tetra-dentate ligand mono-," should read --bi-, tri- or tetra-dentate ligand and non-chiral mono-,--.

At column 14, line 15, "of Sc, Ti, Zr, Hf, V, Ta," should read --of Sc, Ti, Zr, Hf, V, Nb, Ta,--.

At column 14, line 48, "comorises" should read --comprises--.

At column 14, line 49, "steo" should read --step--.

At column 14, line 58, "using" should be --re-using--.

Signed and Sealed this

Seventeenth Day of June, 2008

JON W. DUDAS
*Director of the United States Patent and Trademark Office*